United States Patent
Lorenz et al.

(10) Patent No.: US 9,816,421 B2
(45) Date of Patent: Nov. 14, 2017

(54) AFTERTREATMENT EXHAUST SEPARATOR AND/OR DEFLECTOR

(71) Applicant: Cummins Emission Solutions Inc., Columbus, IN (US)

(72) Inventors: Tyler K. Lorenz, McFarland, WI (US); Mihai Chiruta, Madison, WI (US); James Klingbeil, Edgerton, WI (US); Jeremy D. Harris, Franklin, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 139 days.

(21) Appl. No.: 14/735,953

(22) Filed: Jun. 10, 2015

(65) Prior Publication Data

US 2016/0363027 A1    Dec. 15, 2016

(51) Int. Cl.
*F01N 1/00*   (2006.01)
*F01N 3/28*   (2006.01)
*F01N 3/20*   (2006.01)

(52) U.S. Cl.
CPC ......... *F01N 3/2892* (2013.01); *F01N 3/2066* (2013.01); *F01N 2240/20* (2013.01); *F01N 2610/02* (2013.01); *Y02T 10/24* (2013.01)

(58) Field of Classification Search
CPC ............................. F01N 3/2066; F01N 3/2892
See application file for complete search history.

(56) References Cited

U.S. PATENT DOCUMENTS

| | | | |
|---|---|---|---|
| 8,079,211 B2 * | 12/2011 | Levin | B01F 3/04049 60/274 |
| 8,438,839 B2 | 5/2013 | Floyd et al. | |
| 8,490,390 B2 | 7/2013 | Henry et al. | |
| 8,745,975 B2 * | 6/2014 | Jaruvatee | B01F 5/0471 60/303 |

(Continued)

FOREIGN PATENT DOCUMENTS

| | | |
|---|---|---|
| DE | 1020090 46 280 | 5/2011 |
| DE | 10 2014 104 224 | 10/2015 |

(Continued)

OTHER PUBLICATIONS

Search Report for United Kingdom Patent Application No. GB1609699.2, dated Aug. 30, 2016, 4 pages.

*Primary Examiner* — Jesse Bogue
(74) *Attorney, Agent, or Firm* — Foley & Lardner LLP

(57) ABSTRACT

An exhaust elbow includes an upstream sidewall defining an upstream portion of the exhaust elbow, a downstream sidewall defining a downstream portion of the exhaust elbow, and a deflector. The upstream portion is configured to receive an upstream exhaust gas. The deflector is coupled to the upstream sidewall of the exhaust elbow upstream and is configured to deflect a portion of the upstream exhaust gas received by the upstream portion of the exhaust elbow away from a region of an interior of the exhaust elbow into which an injected reductant from a dosing module is injected. The deflector may reduce and/or prevent formation of reductant deposits on a downstream sidewall. In some implementa- (Continued)

tions, an exhaust assisted flow separator may also be included to direct a portion of the upstream exhaust gas received by the upstream portion of the exhaust elbow through a dosing opening.

20 Claims, 4 Drawing Sheets

(56) References Cited

U.S. PATENT DOCUMENTS

| | | | |
|---|---|---|---|
| 8,756,921 B2 * | 6/2014 | Troxler | F01N 3/2066 |
| | | | 60/274 |
| 2009/0158717 A1 | 6/2009 | Kimura et al. | |
| 2010/0212292 A1 * | 8/2010 | Rusch | F01N 3/2066 |
| | | | 60/274 |
| 2014/0196441 A1 | 7/2014 | Katou et al. | |
| 2016/0047288 A1 * | 2/2016 | Arrowsmith | B01F 5/0473 |
| | | | 60/274 |

FOREIGN PATENT DOCUMENTS

| | | |
|---|---|---|
| GB | 2 512 934 | 10/2014 |
| JP | 2010-031779 | 2/2010 |
| JP | 2010-180863 | 8/2010 |
| WO | WO-2013/010700 | 1/2013 |

* cited by examiner

AFTERTREATMENT EXHAUST SEPARATOR AND/OR DEFLECTOR

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, an SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to devices for providing exhaust assistance to injected reductant and, in some instances, flow deflection and/or redirection. Some exhaust aftertreatment systems include an elbow for an exhaust system that includes an elbow-mounted dosing module. The elbow can include an exhaust assisted flow separator for diverting a portion of the upstream exhaust gas to assist in increasing the velocity of the injected reductant to reduce and/or eliminate the likelihood of injected reductant impacting a sidewall of the elbow and/or downstream decomposition chamber. The exhaust assisted flow separator diverts a portion of the upstream exhaust gas to surround injected reductant and forces the reductant through an opening for increasing mixing and evaporation. In some instances, a deflector may be provided, either in addition to or in lieu of the exhaust assisted flow separator, to prevent upstream exhaust gas from deflecting the injected reductant toward a sidewall. The deflector includes a length of material to divert or assist the upstream exhaust gas in flowing around a curvature of the elbow while also reducing and/or substantially preventing the upstream exhaust gas from deflecting the injected reductant toward aftertreatment walls, thereby reducing the likelihood of reductant deposit generation and/or growth. In some instances, the combination of the added velocity and/or mixing provided to the injected reductant by the exhaust assisted flow separator in addition to the deflection of upstream exhaust gas by the deflector may substantially reduce and/or prevent reductant deposit generation and/or growth.

One implementation relates to an exhaust elbow that includes an upstream sidewall defining an upstream portion of the exhaust elbow, a downstream sidewall defining a downstream portion of the exhaust elbow, and a deflector. The upstream portion is configured to receive an upstream exhaust gas. The deflector is coupled to the upstream sidewall of the exhaust elbow upstream and is configured to deflect a portion of the upstream exhaust gas received by the upstream portion of the exhaust elbow away from a region of an interior of the exhaust elbow into which an injected reductant from a dosing module is injected.

In some implementations, the deflector prevents formation of reductant deposits on the downstream sidewall of the exhaust elbow opposite a flow direction from which the upstream exhaust gas is received. In some implementations, the deflector is one of a flat plate, a curved plate, an arcuate portion of a tube, or an airfoil. In some implementations, a portion of the deflector curves about the region of the interior of the exhaust elbow into which injected reductant from a dosing module is injected. In some implementations, the deflector is longitudinally aligned with a vertical centered axis of the downstream portion of the exhaust elbow. In some implementations, the deflector is positioned at an angle relative to a vertical centered axis of the downstream portion of the elbow. The angle can be between −45 degrees and +45 degrees, between −30 degrees and +30 degrees, or between −15 degrees and +15 degrees relative to the vertical centered axis. In some implementations, the deflector includes a turning vane configured to redirect the upstream exhaust gas received by the upstream portion of the exhaust elbow from a first direction to a second direction.

Another implementation relates to an exhaust aftertreatment component that includes an upstream sidewall defining an upstream portion of an exhaust elbow, a downstream sidewall defining a downstream portion of the exhaust elbow, an exhaust assisted flow separator, and a deflector. The upstream portion is configured to receive an upstream exhaust gas. The exhaust assisted flow separator is coupled to the upstream sidewall of the exhaust elbow and includes a dosing opening. The exhaust assisted flow separator is configured to direct a first portion of the upstream exhaust gas received by the upstream portion of the exhaust elbow through the dosing opening. The deflector is coupled to the exhaust assisted flow separator and is configured to deflect a second portion of the upstream exhaust gas received by the upstream portion of the exhaust elbow away from a region of an interior of the exhaust elbow into which an injected reductant from a dosing module is injected.

In some implementations, the exhaust assisted flow separator is configured to increase a velocity of the injected reductant via the first portion of the upstream exhaust gas. In some implementations, the exhaust assisted flow separator includes a dosing portion and an exhaust gas separation portion. The dosing portion includes a base with the dosing opening and a sidewall, and the exhaust assisted flow separator is coupled to the upstream sidewall of the exhaust elbow by the sidewall of the dosing portion. The exhaust gas separation portion includes an angled base. In some implementations, the exhaust gas separation portion also includes one or more sidewalls, and the exhaust assisted flow separator is further coupled to the upstream sidewall of the exhaust elbow by the one or more sidewalls of the exhaust gas separation portion. In some implementations, the deflector prevents formation of reductant deposits on the downstream sidewall of the exhaust elbow opposite a flow direction from which the upstream exhaust gas is received. In some implementations, the deflector is one of a flat plate, a curved plate, an arcuate portion of a tube, or an airfoil. In some implementations, the deflector is positioned at an angle relative to a vertical centered axis of the downstream portion of the elbow. The angle can be between −45 degrees and +45 degrees or between −15 degrees and +15 degrees relative to the vertical centered axis. In some implementations, the deflector includes a turning vane configured to redirect the upstream exhaust gas received by the upstream portion of the exhaust elbow from a first direction to a second direction.

Yet a further implementation relates to a method that includes providing an exhaust elbow for an exhaust system. The exhaust elbow includes an upstream sidewall defining an upstream portion of the exhaust elbow and a downstream sidewall defining a downstream portion of the exhaust elbow. The upstream portion is configured to receive an upstream exhaust gas. The method includes coupling an exhaust assisted flow separator to the upstream sidewall of the exhaust elbow. The exhaust assisted flow separator includes a dosing opening and is configured to direct a first portion of the upstream exhaust gas received by the upstream portion of the exhaust elbow through the dosing opening. The method further includes coupling a deflector to a portion of the exhaust assisted flow separator. The deflector is configured to deflect a second portion of the upstream exhaust gas received by the upstream portion of the exhaust elbow away from a region of an interior of the exhaust elbow into which an injected reductant from a dosing module is injected.

In some implementations, the method further includes coupling an upstream end of the upstream portion of the exhaust elbow to an upstream portion of the exhaust system, and coupling a downstream end of the downstream portion of the exhaust elbow to a downstream portion of the exhaust system. In some implementations, the method still further includes coupling a dosing module to a dosing module mounting portion of the exhaust elbow. In some implementations, the exhaust assisted flow separator is configured to increase a velocity of the injected reductant via the first portion of the upstream exhaust gas. In some implementations, the deflector prevents formation of reductant deposits on the downstream sidewall of the exhaust elbow opposite a flow direction from which the upstream exhaust gas is received.

BRIEF DESCRIPTION

The details of one or more implementations are set forth in the accompanying drawings and the description below. Other features, aspects, and advantages of the disclosure will become apparent from the description, the drawings, and the claims, in which:

Figure 1:
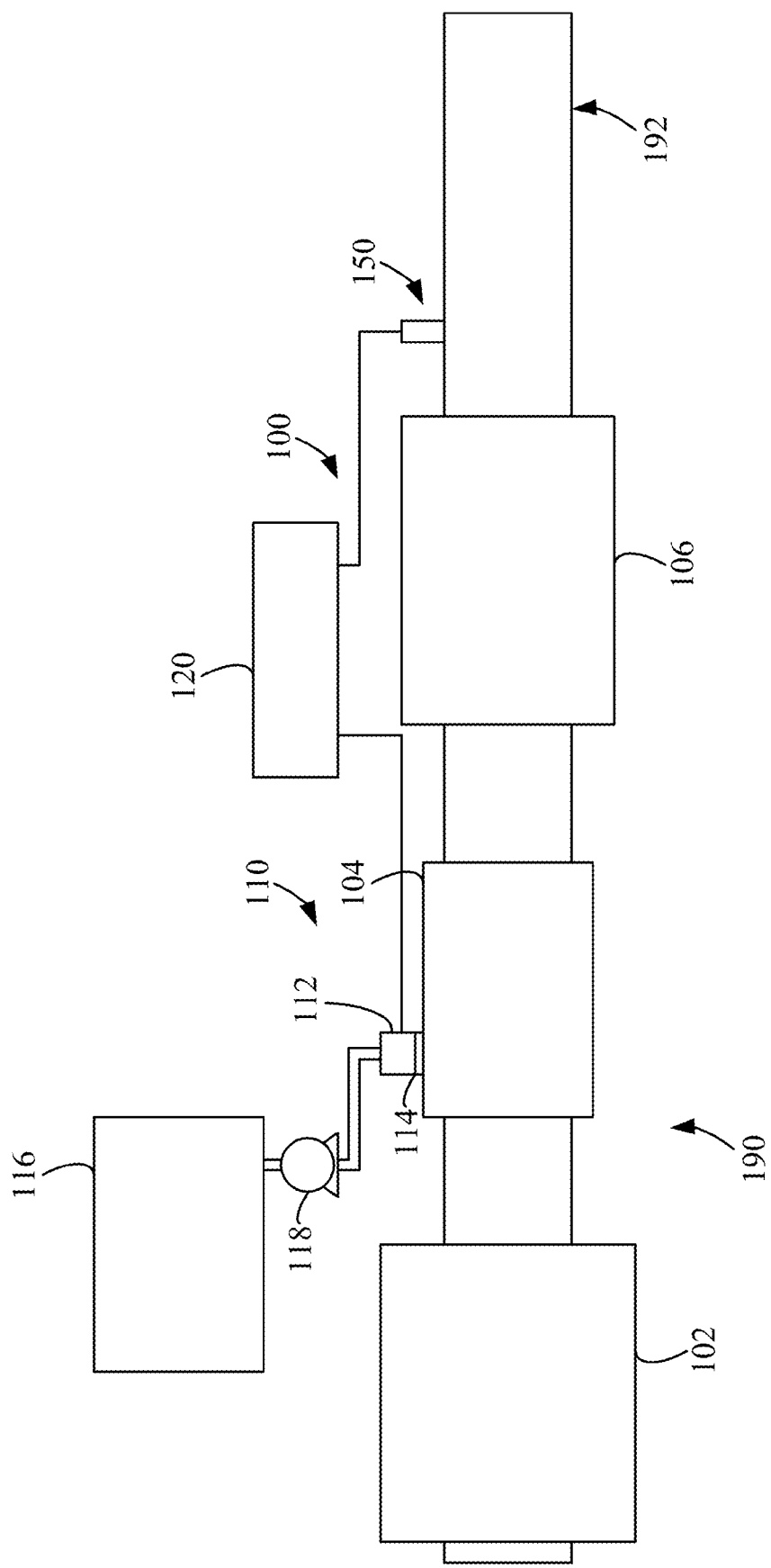
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for providing exhaust assistance to injected reductant and, in some instances, flow deflection and/or redirection. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Exhaust systems can be provided for several different internal combustion engine applications, such as on and off road vehicles, mining equipment, power generation, etc. Some exhaust systems may include an aftertreatment system for treating exhaust gases produced as part of the combustion process. For instance, some exhaust systems include selective catalytic reduction systems to treat $NO_x$ emissions within the exhaust gas. Such systems can include a liquid dosing module, such as a urea or diesel exhaust fluid dosing module, for injecting reductant into exhaust gas flowing through the exhaust system, such as into a decomposition chamber. The reductant droplets undergo the processes of evaporation, thermolysis, and hydrolysis to form gaseous ammonia within the decomposition chamber of the exhaust system. The reductant droplets mix with the exhaust and evaporate in order to distribute the gaseous ammonia evenly to downstream catalysts. In some instances, such as exhaust systems without size and/or configuration constraints, a long, straight decomposition chamber may be used with a dosing module mounted to a sidewall to inject reductant into the decomposition chamber. The sidewall mounting of the dosing module may permit reductant to be injected toward the middle of the decomposition chamber and flow along the length of the decomposition chamber to allow sufficient mixing, evaporation, thermolysis, and hydrolysis to occur upstream of a catalyst, such as an SCR catalyst.

In some instances, sidewall mounting of the dosing module may not be possible, such as due to size and/or configuration constraints. For example, the aftertreatment system may be located in an engine bay with limited capacity and/or configuration constraints that may only be capable of accommodating an elbow-mounted dosing module. In other instances, the usage of an elbow-mounted dosing module may be preferable, such as for reducing and/or compacting the size of an aftertreatment system or integrating the elbow decomposition chamber in to a single SCR body or package. When exhaust gas is flowing through an elbow of the exhaust gas system that includes an elbow-mounted dosing module for injecting reductant, the exhaust gas upstream of the injected reductant may cause the injected reductant to flow toward and/or collide with a sidewall of the elbow and/or a downstream exhaust system component, such as a decomposition chamber. When liquid reductant collides with a sidewall of the exhaust gas system, deposit generation or growth may occur. For high exhaust gas flow conditions, the effect of the exhaust gas on the injected reductant may further increase the deposit generation and/or growth risk. For some sidewall materials, such as stainless steel, the reductant deposits may result in erosion of the sidewall material in addition to and/or in lieu of potentially increasing backpressure, reducing and/or disrupting the mixing of exhaust gas and injected reductant, and/or decreasing the uniformity of the resulting gaseous ammonia and exhaust gas mixture. Weldment erosion can result in leaks and/or lead to potential structural failure modes. Elimination and/or reduction in the generation and/or growth of deposits may be advantageous for certain aftertreatment systems.

Implementations described herein relate to exhaust aftertreatment systems that include an elbow for an exhaust system that includes an elbow-mounted dosing module. In some implementations, the elbow includes an exhaust assisted flow separator for diverting a portion of the upstream exhaust gas to assist in increasing the velocity of the injected reductant to reduce and/or eliminate the likelihood of injected reductant impacting a sidewall of the elbow and/or downstream decomposition chamber. The exhaust assisted flow separator diverts a portion of the upstream exhaust gas to surround the reductant spray cone and forces the reductant through an opening for increasing mixing and evaporation.

In some instances, a deflector may be provided to prevent upstream exhaust gas from deflecting the injected reductant toward aftertreatment walls. The deflector may be provided either in addition to and/or independently of the exhaust assisted flow separator. The deflector includes a length of material to divert or assist the upstream exhaust gas in flowing around the curvature of the elbow while also reducing and/or substantially preventing the upstream exhaust gas from deflecting the injected reductant toward aftertreatment walls, thereby reducing the likelihood of reductant deposit generation and/or growth. In some instances, the deflector may be a solid piece of material, such as a sheet and/or curved portion of metal, to deflect the upstream exhaust gas flow. In other instances, the deflector may include perforations, slots, mesh, vanes, and/or other material to allow a reduced amount of exhaust gas to flow through or around the deflector. The length of the deflector may be based on a distance the injected reductant for the elbow must travel to sufficiently mix, evaporate, thermolyze, and hydrolyze such that contact with a sidewall does not form a reductant deposit.

In some instances, the combination of the added velocity and/or mixing provided to the injected reductant by the exhaust assisted flow separator in addition to the deflection of upstream exhaust gas by the deflector may substantially reduce and/or prevent reductant deposit generation and/or growth.

In some implementations, the exhaust decomposition elbow with the integrated dosing module may be internalized to a larger aftertreatment body while still allowing adequate accessibility to the serviceable doser. This single package integration of the decomposition elbow allows for a reduced space-claim and further insulation of the decomposition chamber walls to reduce the risk of deposits. The exhaust assisted flow separator is coupled to the upstream sidewall of the exhaust elbow and includes a dosing opening. The exhaust assisted flow separator is configured to direct a first portion of the upstream exhaust gas received by the upstream portion of the exhaust elbow through the dosing opening. The deflector is coupled to the exhaust assisted flow separator and is configured to deflect a second portion of the upstream exhaust gas received by the upstream portion of the exhaust elbow away from a region of an interior of the exhaust elbow into which an injected reductant from a dosing module is injected.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit. In some implementations, the dosing module 112 may instead be positioned downstream of a turbocharger(s) or upstream of a turbocharger(s).

The sensor 150 may be coupled to the exhaust system 190 to detect a condition of the exhaust gas flowing through the exhaust system 190. In some implementations, the sensor 150 may have a portion disposed within the exhaust system 190, for example a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at other positions of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190

III. Example Exhaust Aftertreatment Separator

An exhaust aftertreatment system, such as the exhaust system 190 of FIG. 1, includes a dosing module to inject and decompose a chemical reductant (e.g., urea, diesel exhaust fluid, etc.) in a decomposition chamber. The reductant mixes with the exhaust gas and evaporates in order to distribute the resulting exhaust gas and gaseous ammonia mixture evenly to a downstream catalyst. For exhaust systems with an elbow-mounted dosing module, the exhaust flows around the elbow while reductant is injected from the dosing module. In some instances, the exhaust gas upstream of the injected reductant may cause the injected reductant to flow toward and/or collide with a sidewall of the elbow and/or a downstream decomposition chamber. When liquid reductant collides with a sidewall of the exhaust gas system, deposit generation or growth may occur. For high exhaust gas flow conditions, the effect of the exhaust gas on the injected reductant may further increase the deposit generation and/or growth risk.

Figure 2:
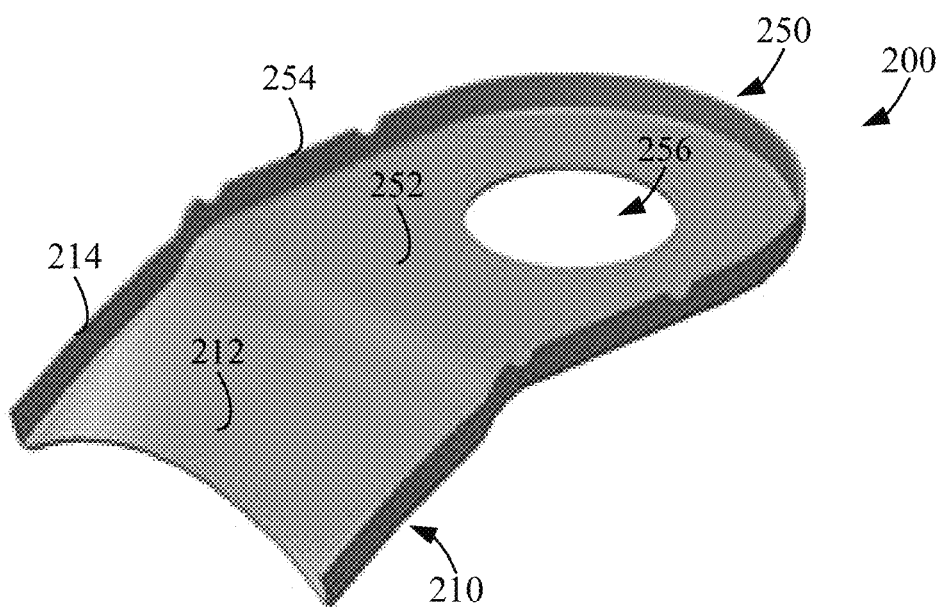
FIG. 2 is a perspective view of an implementation of an exhaust assisted flow separator.

FIG. 2 depicts an exhaust assisted flow separator 200 for providing separated upstream exhaust gas with and/or about the injected reductant to reduce and/or prevent reductant deposit generation and/or growth. The exhaust assisted flow separator 200 provides a portion of the upstream exhaust gas with the injected reductant to increase the flow velocity of the injected reductant and/or to increase the mixing and evaporation of the injected reductant. That is, the increased flow velocity imparted to the injected reductant by the upstream exhaust gas may reduce the amount of deflection of the injected reductant and exhaust gas mixture when the remaining upstream exhaust gas encounters the injected reductant and exhaust gas mixture in the downstream leg of the elbow. The reduced deflection may reduce and/or substantially prevent the injected reductant from impacting a sidewall, thereby reducing and/or substantially preventing formation of reductant deposits. In addition, the portion of the upstream exhaust gas provided with the injected reductant may swirl and/or otherwise mix with the injected reductant and increases the temperature of the injected reductant. The added mixing and temperature increases the mixing and evaporation of the injected reductant into a gaseous ammonia and exhaust gas mixture prior to encountering the remaining upstream exhaust gas in the elbow, thereby also reducing and/or substantially preventing the injected reductant from impacting the sidewall and the formation of reductant deposits.

The exhaust assisted flow separator 200 includes an exhaust gas separation portion 210 and a dosing portion 250. The exhaust gas separation portion 210 includes an angled base 212 for diverting at least a portion of upstream exhaust gas toward the dosing portion 250. The angled base 212 can be a flat plate, a curved plate (either parallel and/or perpendicular to an axis of the flow of the upstream exhaust gas), and/or any other configuration for diverting a portion of the upstream exhaust gas. In some implementations, the angle and/or length of the angled base 212 may be based on an amount of upstream exhaust gas to be diverted. For instance, the angle and/or length of the angled base 212 may be selected based on an inlet aperture area and/or a percentage of the total exhaust flow. The inlet aperture area is the is an area formed between the angled base 212 and an upstream sidewall of an elbow of an exhaust gas system, such as upstream sidewall 274 of elbow 270 of FIG. 3, in a plane perpendicular to the flow of the upstream exhaust gas.

In some implementations, the exhaust gas separation portion 210 includes one or more sidewalls 214 extending from the angled base 212 to assist in the diversion of upstream exhaust gas. The one or more sidewalls 214 may be coupled and/or attached to a portion of an upstream sidewall of an elbow of an exhaust gas system, such as the upstream sidewall 274 of the elbow 270 of FIG. 3.

The dosing portion 250 is configured to collect and guide separated upstream exhaust gas from the exhaust gas separation portion 210 around a reductant spray cone from an elbow-mounted dosing module of the elbow of the exhaust gas system. The dosing portion 250 includes a sidewall 254 and a base 252. The sidewall 254 and base 252, when coupled or attached to a portion of the elbow of the exhaust gas system, collect and guide separated upstream exhaust gas around a reductant spray cone.

In the implementation shown in FIG. 2, the base 252 includes a dosing opening 256 through which the injected reductant of the reductant spray cone and the separated upstream exhaust gas flow. The dosing opening 256 may be a circular opening, an ovular opening, an egg-shaped opening, a tear drop opening, a square opening, a triangular opening, a rectangular opening, etc. The dosing opening 256 may be aligned with an injector tip of a dosing module and/or the injector tip of the dosing module may be offset relative to the dosing opening 256. The separated upstream exhaust gas is directed toward the injector tip of the dosing module via the dosing portion 250 and then forced though the dosing opening 256 formed through the base 254 of the dosing portion 250. During reductant dosing, the rapid blending of the exhaust flow and reductant through the dosing opening 256 results in a blended reductant and exhaust gas stream, which can impart additional velocity to the injected reductant, increase the mixing of the exhaust gas and injected reductant through the dosing opening 256, and/or increase the temperature of the injected reductant to increase the evaporation of the injected reductant. This leads to increased performance of the aftertreatment system due to greater reductant evaporation, improved mixing, and/or reduced impingement of the injected reductant with a sidewall of the elbow and/or decomposition chamber. In some implementations, the dosing opening 256 may include turbulators for increasing the turbulent flow of the separated upstream exhaust gas flow. In other implementations, the dosing opening 256 may include a fully flanged lip, a partial flange, or other formed features. Additionally, an implementation may involve more than one dosing module that may dose through a single or multiple dosing openings 256.

Figure 3:
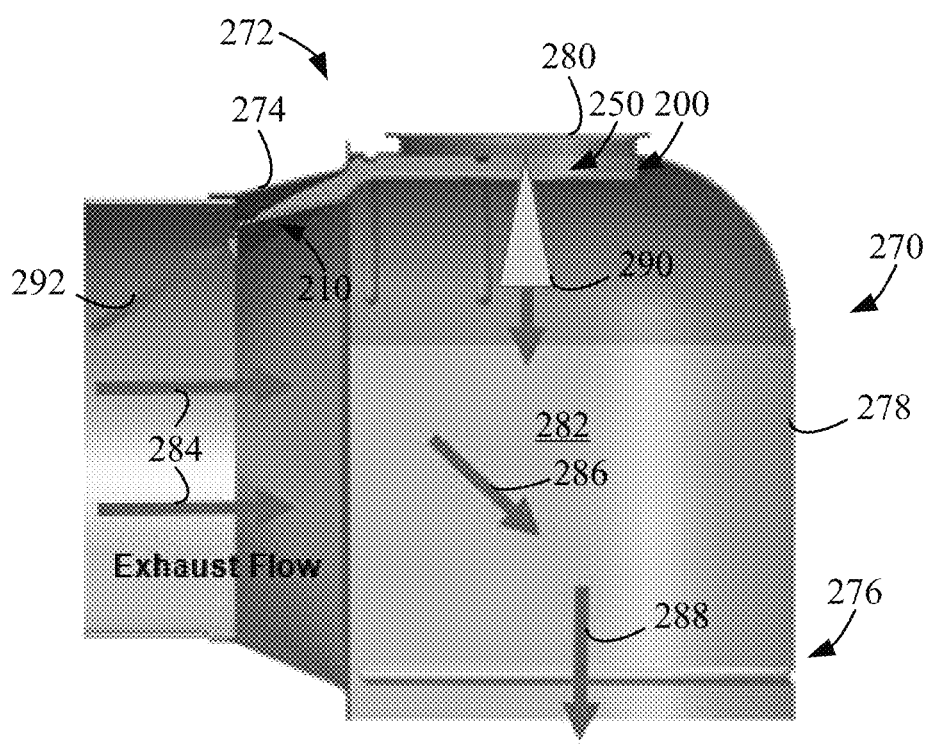
FIG. 3 is a partial cross-sectional view of an elbow of an exhaust system having an elbow-mounted dosing module and the exhaust assisted flow separator of FIG. 2.

FIG. 3 depicts a partial cross-section of an elbow 270 of an exhaust gas system that includes an upstream portion 272 configured to receive exhaust gas from an upstream portion of the exhaust gas system and a downstream portion 276 configured to provide a gaseous ammonia and exhaust gas mixture to a downstream portion of the exhaust gas system. The elbow 270 of FIG. 3 is a 90 degree elbow such that the upstream portion 272 and downstream portion 276 are positioned 90 degrees relative to each other. Other angles of elbows may be used as well, such as an elbow forming an angle between the upstream portion 272 and downstream portion 276 of between 15 degrees to 165 degrees, between 30 degrees to 150 degrees, between 45 degrees to 135 degrees, between 60 degrees to 120 degrees, between 75 degrees to 105 degrees, etc. The upstream portion 272 is defined by an upstream sidewall 274 and the downstream portion 276 is defined by a downstream sidewall 278. In some implementations, the upstream sidewall 274 and downstream sidewall 278 define a tubular upstream portion 272 and downstream portion 276 (e.g., having a circular and/or ovular cross-section in a plane perpendicular to the upstream flow of the exhaust gas). In other implementations, the upstream portion 272 and downstream portion 276 have a square cross-section, a triangular cross-section, and/or any other geometric shape cross-section. The elbow 270 includes a dosing module mounting portion 280 for mounting and/or coupling a dosing module to the elbow 270. The dosing module mounting portion 280 includes an opening through which injected reductant 290 can be dosed into an interior 282 of the elbow 270.

As shown by directional arrows 284, 286, 288, upstream exhaust gas is received by the upstream portion 276 flowing in a first direction 284 and is redirected to flow in a second direction 288 via the elbow 270 into the downstream portion 276 to be provided to a downstream portion of the exhaust gas system. When reductant is injected by a dosing module coupled to the dosing module mounting portion 280, the injected reductant 290 in the interior 282 of the elbow 270 encounters the upstream exhaust gas flowing through the elbow 270. In some implementations, the upstream exhaust gas flowing in the first direction 284 and/or an intermediate direction 286 can deflect and/or otherwise urge the injected reductant 290 toward the downstream sidewall 278 and/or a sidewall of a downstream component of the exhaust system, such as a decomposition chamber.

The exhaust assisted flow separator 200 of FIG. 2 is coupled to a portion of the upstream sidewall 274 of the elbow 270. The exhaust gas separation portion 210 separates a portion 292 of the upstream exhaust gas from the remaining upstream exhaust gas, shown by first directional arrows 284. As noted above, the portion 292 of the upstream exhaust gas is directed by the exhaust gas separation portion 210 to within the area defined by the dosing portion 250. The dosing portion 250 directs the separated upstream exhaust gas toward the injector tip of the dosing module and then forces the separated upstream exhaust gas though the dosing opening 256 formed through the base 254 of the dosing portion 250. During reductant dosing, the rapid blending of the exhaust flow and reductant through the dosing opening 256 results in a blended reductant and exhaust gas stream. This can impart additional velocity to the injected reductant, increase the mixing of the exhaust gas and injected reductant through the dosing opening 256, and/or increase the temperature of the injected reductant to increase the evaporation of the injected reductant. This leads to increased performance of the aftertreatment system due to greater reductant evaporation, improved mixing, and/or reduced impingement of the injected reductant with a sidewall of the elbow and/or decomposition chamber.

IV. Example Exhaust Aftertreatment Deflector

Figure 4:
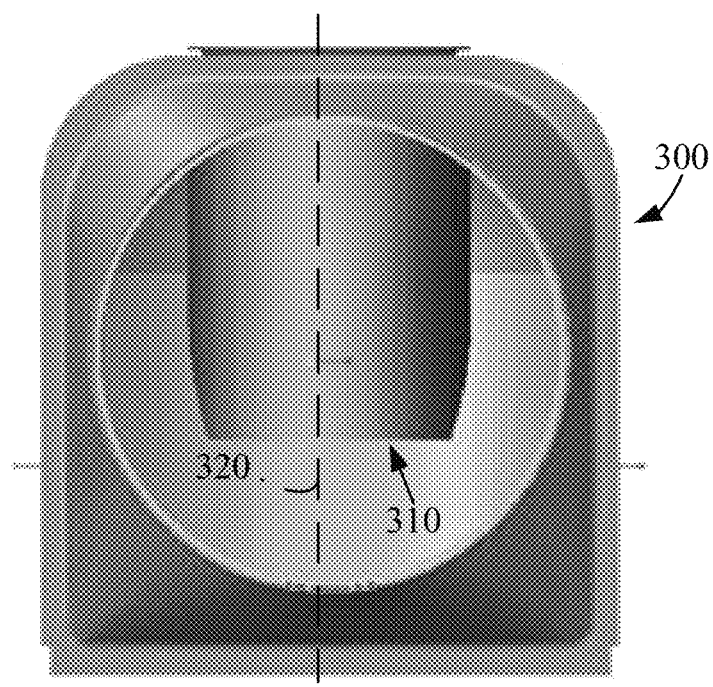
FIG. 4 is an elevation view of an elbow of an exhaust system having an elbow-mounted dosing module and a deflector.

FIG. 4 depicts an elbow 300 of an exhaust system with a deflector 310 disposed within the elbow 300 and configured to deflect a portion of upstream exhaust gas away from reductant injected into the elbow 300 by a dosing module. The elbow 300 may have a substantially similar construction to the elbow 270 of FIG. 3. In the implementation shown, the deflector 310 is positioned within a portion of the upstream portion of the elbow 300 to deflect and/or redirect at least a portion of the upstream exhaust gas towards the downstream portion of the elbow 300 to reduce the amount of upstream exhaust gas that encounters the injected reductant. The deflector 310 may reduce and/or substantially prevent the upstream exhaust gas from deflecting the injected reductant, such as due to the upstream exhaust gas flow momentum, toward a downstream sidewall of the elbow 300 and/or a sidewall of a downstream component of the exhaust system, such as a decomposition chamber.

The deflector 310 may be a flat plate, a curved plate (convex and/or concave), an arcuate portion of a tube, a 3-sided rectangular portion of a tube, an airfoil, a perforated plate, a slotted plate, etc. A first portion of the deflector 310 is coupled to a sidewall of the upstream portion of the elbow and/or another component, such as the exhaust assisted flow separator 200 of FIG. 2, and a second portion of the deflector 310 extends into the passageway formed by the upstream portion of the elbow 300 through which exhaust gas flows. In some implementations, the deflector 310 is coupled to the upstream sidewall of the upstream portion of the elbow 300 and curves about a portion of the region of the interior of the elbow 300 into which the reductant is injected by the dosing module. Thus, the deflector 310 deflects the upstream exhaust gas flow about the injected reductant so that the momentum from the upstream exhaust gas is not transferred to the injected reductant to deflect the injected reductant toward the downstream sidewall of the elbow 300 and/or a sidewall of a downstream component of the exhaust system, such as a decomposition chamber.

In some implementations, the deflector 310 is longitudinally aligned with a vertical centered axis 320 of the downstream portion of the elbow. In other implementations, the deflector 310 is positioned at an angle relative to the vertical centered axis 320 of the downstream portion of the elbow 300. For instance, the angle of the deflector 310 may be between −75 degrees and +75 degrees, between −60 degrees and +60 degrees, between −45 degrees and +45 degrees, between −30 degrees and +30 degrees, between −15 degrees and +15 degrees, and/or combinations thereof relative to the vertical centered axis 320 of the downstream portion of the elbow 300.

The positive angles of the deflector 310 relative to the vertical centered axis 320 of the downstream portion of the elbow 300 refer to angles of the deflector 310 toward the upstream portion of the elbow 300 and away from the vertical centered axis 320 of the downstream portion of the elbow 300. Thus, the deflector 310 may angle into the upstream portion of the elbow 300. The angling of the deflector 310 into the upstream portion of the elbow 300 may accommodate the expansion of a cone of injected reductant while deflecting exhaust gas about the injected reductant.

The negative angles of the deflector 310 relative to the vertical centered axis 320 of the downstream portion of the elbow 300 refer to angles of the deflector 310 away from the upstream portion of the elbow 300 and toward the vertical centered axis 320 of the downstream portion of the elbow 300. Thus, the deflector 310 may angle into the downstream portion of the elbow 300. The angling of the deflector 310 into the downstream portion of the elbow 300 may assist in guiding and/or redirecting the upstream exhaust gas into the downstream portion of the elbow 300 while reducing the impact of the deflector 310 on the backpressure of the exhaust system.

In some implementations, portions of the deflector 310 may be positively and negatively angled relative to the vertical centered axis 320 of the downstream portion of the elbow 300, such as a concave plate with a positive angle to divert flow around the injected reductant, but with a convex end, such as a turning vane. In some implementations, multiple turning vanes may be incorporated into the deflector 310 to assist in the redirection of the upstream exhaust gas while also deflecting the upstream exhaust gas flow around and/or away from the injected reductant. In other implementations, the deflector 310 may include perforations, mesh, winglets, etc.

For a 90 degree elbow where exhaust momentum direction is changing from the upstream portion to the downstream portion, the deflector 310 can reduce and/or substantially prevent the upstream exhaust gas from deflecting the injected reductant into a sidewall of the downstream portion of the elbow 300 and/or a sidewall of a downstream exhaust component, such as a decomposition chamber. By reducing and/or substantially preventing the deflection of the injected reductant into downstream sidewalls, the deflector 310 also reduces and/or substantially prevents the formation of reductant deposits. This leads to increased performance of the aftertreatment system due to greater reductant evaporation, improved mixing, and/or reduced impingement of the injected reductant with a sidewall of the elbow and/or decomposition chamber. In some implementations, the deflector 310 may also induce eddy currents into the deflected exhaust gas flowing through the elbow 300, thereby further increasing the mixing and evaporation.

V. Example Exhaust Aftertreatment Separator and Deflector

Figure 5:
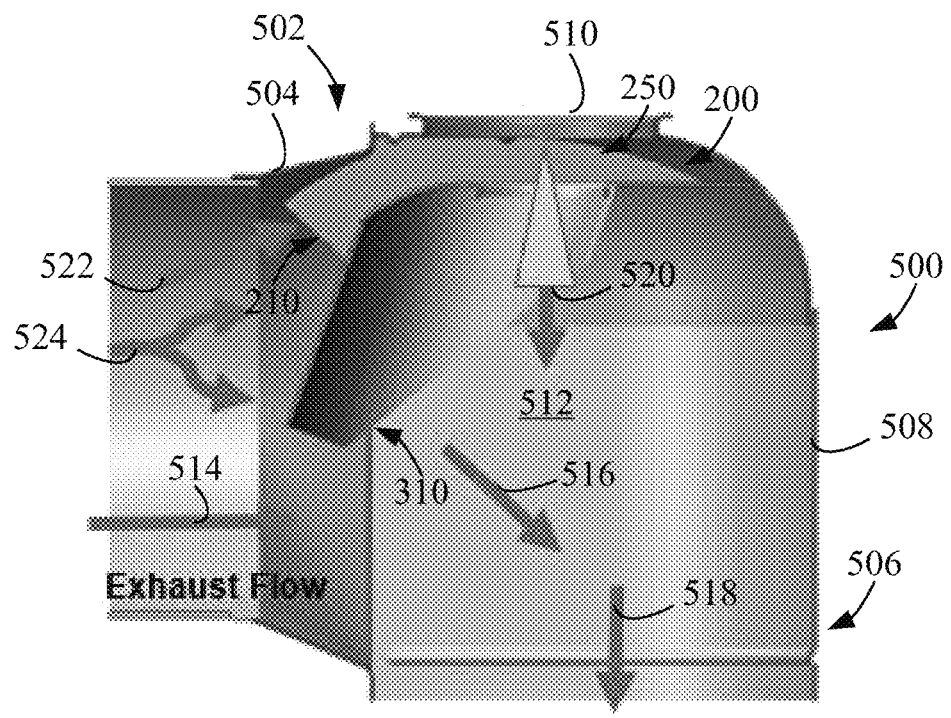
FIG. 5 is a partial cross-sectional view of an elbow of an exhaust system having an elbow-mounted dosing module, the deflector of FIG. 4, and an exhaust assisted flow separator.

FIG. 5 depicts a partial cross-section of an elbow 500 of an exhaust gas system that includes an upstream portion 502 configured to receive exhaust gas from an upstream portion of the exhaust gas system and a downstream portion 506 configured to provide a gaseous ammonia and exhaust gas mixture to a downstream portion of the exhaust gas system. The elbow 500 includes the exhaust assisted flow separator 200 of FIGS. 2-3 and the deflector 310 of FIG. 4 positioned within the elbow 500. The elbow 500 of FIG. 5 is a 90 degree elbow such that the upstream portion 502 and downstream portion 506 are positioned 90 degrees relative to each other. Other angles of elbows may be used as well, such as an elbow forming an angle between the upstream portion 502 and downstream portion 506 of between 15 degrees to 165 degrees, between 30 degrees to 150 degrees, between 45 degrees to 135 degrees, between 60 degrees to 120 degrees, between 75 degrees to 105 degrees, etc. The upstream portion 502 is defined by an upstream sidewall 504 and the downstream portion 506 is defined by a downstream sidewall 508. In some implementations, the upstream sidewall 504 and downstream sidewall 508 define a tubular upstream portion 502 and downstream portion 506 (e.g., having a circular and/or ovular cross-section in a plane perpendicular to the upstream flow of the exhaust gas). In other implementations, the upstream portion 502 and downstream portion 506 have a square cross-section, a triangular cross-section, and/or any other geometric shape cross-section. The elbow 500 includes a dosing module mounting portion 510 for mounting and/or coupling a dosing module to the elbow 500. The dosing module mounting portion 510 includes an opening through which injected reductant 520 can be dosed into an interior 512 of the elbow 500.

As shown by directional arrows 514, 516, 518, upstream exhaust gas is received by the upstream portion 506 flowing in a first direction 514 and is redirected to flow in a second direction 518 via the elbow 500 into the downstream portion 506 to be provided to a downstream portion of the exhaust gas system. Without the deflector 310, when reductant is injected by a dosing module coupled to the dosing module mounting portion 510, the injected reductant 520 in the interior 512 of the elbow 500 encounters the upstream exhaust gas flowing through the elbow 500. In some implementations, the upstream exhaust gas flowing in the first direction 514 and/or an intermediate direction 516 can deflect and/or otherwise urge the injected reductant 520 toward the downstream sidewall 508 and/or a sidewall of a downstream component of the exhaust system, such as a decomposition chamber.

The deflector 310 is coupled to a portion of the upstream sidewall 504 of the elbow 500 and deflects and/or diverts a portion 524 of the upstream exhaust gas flow around and/or away from the injected reductant 520. Accordingly, the deflector 310 can reduce and/or substantially prevent the upstream exhaust gas from deflecting the injected reductant 520 into the downstream sidewall 508 of the downstream portion 506 of the elbow 500 and/or a sidewall of a downstream exhaust component, such as a decomposition chamber. By reducing and/or substantially preventing the deflection of the injected reductant 520 into the downstream sidewalls, the deflector 310 also reduces and/or substantially prevents the formation of reductant deposits. This leads to increased performance of the aftertreatment system due to greater reductant evaporation, improved mixing, and/or reduced impingement of the injected reductant with the downstream sidewall 508 of the elbow 500 and/or decomposition chamber. In some implementations, the deflector 310 may also induce eddy currents into the deflected exhaust gas flowing through the elbow 500, thereby further increasing the mixing and evaporation.

The exhaust assisted flow separator 200 of FIG. 2 is also coupled to a portion of the upstream sidewall 504 of the elbow 500. The exhaust gas separation portion 210 separates a portion 522 of the upstream exhaust gas from the remaining upstream exhaust gas, shown by first directional arrows 514, 524. The portion 522 of the upstream exhaust gas is directed by the exhaust gas separation portion 210 to within the area defined by the dosing portion 250. The dosing portion 250 directs the separated upstream exhaust gas toward the injector tip of the dosing module and then forces the separated upstream exhaust gas though the dosing opening formed through the base of the dosing portion 250. During reductant dosing, the rapid blending of the exhaust flow and reductant through the dosing opening results in a blended reductant and exhaust gas stream, which can impart additional velocity to the injected reductant 520, increase the mixing of the exhaust gas and injected reductant 520 through the dosing opening, and/or increase the temperature of the injected reductant 520 to increase the evaporation of the injected reductant. This leads to increased performance of the aftertreatment system due to greater reductant evaporation, improved mixing, and/or reduced impingement of the injected reductant 520 with the downstream sidewall 508 of the elbow 500 and/or decomposition chamber.

In some implementations, the exhaust assisted flow separator 200 and the deflector 310 may be coupled together and/or formed as a single piece. For example, the deflector 310 may be welded to the base and/or angled base of the exhaust assisted flow separator 200 to extend from the exhaust assisted flow separator 200. In other implementations, the deflector 310 may be used as the angled base of the exhaust gas separation portion 210 of the exhaust assisted flow separator 200.

Figure 6:
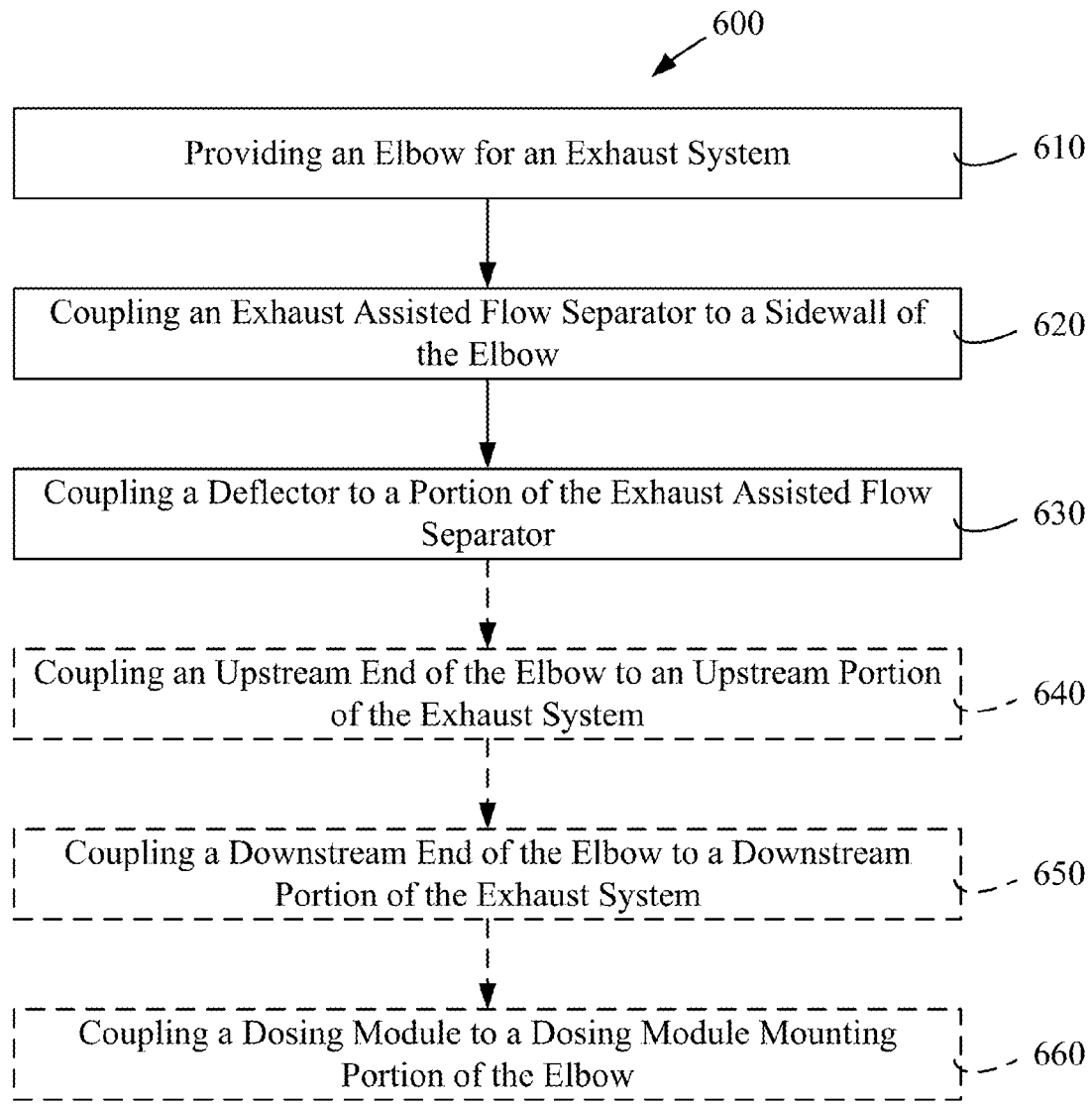
FIG. 6 is a process diagram depicting a process for manufacturing the elbow of FIG. 5 for an exhaust system having the exhaust assisted flow separator of FIG. 2 and the deflector of FIG. 4.

VI. Method of Manufacturing an Exhaust System Elbow with a Separator and Deflector FIG. 6 depicts a process 600 diagram depicting a process for manufacturing the elbow of FIG. 5 having an exhaust system having the exhaust assisted flow separator of FIG. 2 and the deflector of FIG. 4. The method includes providing an elbow for an exhaust system (block 610). The elbow may be constructed in a substantially similar manner to the elbow 500 of FIG. 5 and/or the elbow 270 of FIG. 3. In some implementations, the elbow may be a stock exhaust elbow component and/or any other elbow for an exhaust system.

The process 600 includes coupling an exhaust assisted flow separator to a sidewall of the elbow (block 620). The exhaust assisted flow separator may be constructed in a substantially similar manner to the exhaust assisted flow separator 200 of FIGS. 2-3 and/or 5. The exhaust assisted flow separator may be coupled to an upstream sidewall of the elbow via welding, bolting, clipping, clamping, etc. one or more portions of a sidewall 214, 254 of the exhaust assisted flow separator 200 to the upstream sidewall. In other implementations, the exhaust assisted flow separator may be cast and/or formed with the sidewall of the elbow and/or a dosing module mounting apparatus.

The process 600 includes coupling a deflector to a portion of the exhaust assisted flow separator (block 630). The deflector may be constructed in a substantially similar manner to the deflector 310 of FIGS. 4-5. The deflector may be coupled to the exhaust assisted flow separator via welding, bolting, clipping, clamping, etc. one or more portions of the deflector 310 to the exhaust assisted flow separator. In other implementations, the deflector may be cast and/or formed with the exhaust assisted flow separator to form a single component.

In some implementations, the process 600 includes coupling an upstream end of the elbow to an upstream portion of the exhaust system (block 640). The upstream end of the elbow may be coupled to the upstream portion of the exhaust system via welding, bolting, belting, clipping, clamping, etc.

In some implementations, the process 600 includes coupling a downstream end of the elbow to a downstream portion of the exhaust system (block 650). The downstream end of the elbow may be coupled to the downstream portion of the exhaust system via welding, bolting, belting, clipping, clamping, etc.

In some implementations, the process 600 includes coupling a dosing module to a dosing module mounting portion of the elbow (block 660). The dosing module may be coupled to the dosing module mounting portion of the elbow via welding, bolting, belting, clipping, clamping, etc. In some implementations, an injector tip of the dosing module is aligned with a dosing opening of the exhaust assisted flow separator and/or a portion thereof.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "a portion" is used the item can include a portion and/or the entire item unless specifically stated to the contrary.

What is claimed is:

1. An exhaust elbow comprising:
an upstream sidewall defining an upstream portion of the exhaust elbow, the upstream portion configured to receive an upstream exhaust gas;
a downstream sidewall defining a downstream portion of the exhaust elbow;
an exhaust assisted flow separator including a dosing portion and an exhaust gas separation portion, the exhaust gas separation portion separating a first portion of the received upstream exhaust gas, the dosing portion comprising a sidewall and a base, the base including a dosing opening through which injected reductant and the separated first portion of the received upstream exhaust gas is dosed into the downstream portion of the exhaust elbow, the sidewall coupled to the upstream sidewall and configured to collect and guide the separated first portion of the received upstream exhaust gas around a reductant spray cone of injected reductant; and
a deflector coupled to the exhaust gas separation portion of the exhaust assisted flow separator, the deflector configured to deflect a second portion of the upstream exhaust gas received by the upstream portion of the exhaust elbow away from a region of an interior of the exhaust elbow into which an injected reductant from a dosing module is injected, wherein the deflector is an arcuate portion of a tube shape.

2. The exhaust elbow of claim 1, wherein a portion of the deflector curves about the region of the interior of the exhaust elbow into which injected reductant from a dosing module is injected.

3. The exhaust elbow of claim 1, wherein a longitudinal axis of the deflector is in a plane with a vertical centered axis of the downstream portion of the exhaust elbow.

4. The exhaust elbow of claim 1, wherein the deflector is positioned at an angle relative to a vertical centered axis of the downstream portion of the elbow.

5. The exhaust elbow of claim 4, wherein the angle is between −45 degrees and +45 degrees relative to the vertical centered axis below the upstream sidewall.

6. The exhaust elbow of claim 4, wherein the angle is between −30 degrees and +30 degrees relative to the vertical centered axis below the upstream sidewall.

7. The exhaust elbow of claim 4, wherein the angle is between −15 degrees and +15 degrees relative to the vertical centered axis below the upstream sidewall.

8. The exhaust elbow of claim 1, wherein the deflector comprises a turning vane configured to redirect the upstream exhaust gas received by the upstream portion of the exhaust elbow from a first direction to a second direction.

9. An exhaust aftertreatment component, comprising:
a dosing module;
an upstream sidewall defining an upstream portion of an exhaust elbow, the upstream portion configured to receive an upstream exhaust gas;
a downstream sidewall defining a downstream portion of the exhaust elbow;
an exhaust assisted flow separator coupled to the upstream sidewall of the exhaust elbow, the exhaust assisted flow separator including a dosing portion and an exhaust gas separation portion, the exhaust gas separation portion separating a first portion of the received upstream exhaust gas, the dosing portion comprising a sidewall and a base, the base comprising a dosing opening through which injected reductant and the separated first portion of the received upstream exhaust gas is dosed into the downstream portion of the exhaust elbow, the sidewall coupled to the upstream sidewall and configured to collect and guide the separated first portion of the received upstream exhaust gas around a reductant spray cone of injected reductant; and
a deflector coupled to the exhaust assisted flow separator, the deflector configured to deflect a second portion of the upstream exhaust gas received by the upstream portion of the exhaust elbow away from a region of an interior of the exhaust elbow into which an injected reductant from the dosing module is injected, wherein the deflector is an arcuate portion of a tube shape.

10. The exhaust aftertreatment component of claim 9, wherein the exhaust assisted flow separator comprises a plurality of dosing openings.

11. The exhaust aftertreatment component of claim 9, wherein the exhaust assisted flow separator is configured to increase a velocity of the injected reductant via the first portion of the upstream exhaust gas.

12. The exhaust aftertreatment component of claim 9, wherein the exhaust gas separation portion further comprises one or more sidewalls, and wherein the exhaust assisted flow separator is further coupled to the upstream sidewall of the exhaust elbow by the one or more sidewalls of the exhaust gas separation portion.

13. The exhaust aftertreatment component of claim 9, wherein the deflector is positioned at an angle relative to a vertical centered axis of the downstream portion of the elbow.

14. The exhaust aftertreatment component of claim 13, wherein the angle is between −45 degrees and +45 degrees relative to the vertical centered axis below the upstream sidewall.

15. The exhaust aftertreatment component of claim 13, wherein the angle is between −15 degrees and +15 degrees relative to the vertical centered axis below the upstream sidewall.

16. The exhaust aftertreatment component of claim 9, wherein the deflector comprises a turning vane configured to redirect a third portion of the upstream exhaust gas received by the upstream portion of the exhaust elbow from a first direction to a second direction.

17. A method, comprising:
providing an exhaust elbow for an exhaust system, the exhaust elbow comprising an upstream sidewall defining an upstream portion of the exhaust elbow and a downstream sidewall defining a downstream portion of the exhaust elbow, the upstream portion configured to receive an upstream exhaust gas;
coupling an exhaust assisted flow separator to the upstream sidewall of the exhaust elbow, the exhaust assisted flow separator including a dosing portion and an exhaust gas separation portion, the exhaust gas separation portion separating a first portion of the received upstream exhaust gas, the dosing portion comprising a sidewall and a base, the base comprising a dosing opening through which injected reductant and the separated first portion of the received upstream exhaust gas is dosed into the downstream portion of the exhaust elbow, the side wall coupled to the upstream sidewall and configured to collect and guide the separated first portion of the received upstream exhaust gas around a reductant spray cone of injected reductant; and coupling a deflector to a portion of the exhaust assisted flow separator, the deflector configured to deflect a second portion of the upstream exhaust gas received by the upstream portion of the exhaust elbow away from a region of an interior of the exhaust elbow into which an injected reductant from a dosing module is injected, wherein the deflector is an arcuate portion of a tube shape.

18. The method of claim 17 further comprising:

coupling an upstream end of the upstream portion of the exhaust elbow to an upstream portion of the exhaust system; and coupling a downstream end of the downstream portion of the exhaust elbow to a downstream portion of the exhaust system.

19. The method of claim 18 further comprising:

coupling a dosing module to a dosing module mounting portion of the exhaust elbow.

20. The method of claim 19, wherein the exhaust assisted flow separator is configured to increase a velocity of the injected reductant via the first portion of the upstream exhaust gas.

* * * * *